United States Patent [19]

Mori

[11] Patent Number: 4,623,104
[45] Date of Patent: Nov. 18, 1986

[54] RETRACTOR

[75] Inventor: Shinji Mori, Niwa, Japan

[73] Assignee: Kabushiki Kaisha Tokai-Rika-Denki-Seisakusho, Aichi, Japan

[21] Appl. No.: 761,704

[22] Filed: Aug. 2, 1985

[30] Foreign Application Priority Data

Aug. 6, 1984 [JP] Japan .................. 59-120833[U]

[51] Int. Cl.⁴ .................................. B60R 22/36
[52] U.S. Cl. ................................ 242/107.4 R
[58] Field of Search .......... 242/107, 107.4 R–107.4 E; 280/806, 807; 297/475–478

[56] References Cited

U.S. PATENT DOCUMENTS

| | | | |
|---|---|---|---|
| 4,119,281 | 10/1978 | Paitula et al. ................ | 242/107 |
| 4,206,887 | 6/1980 | de Rosa ................ | 242/107.4 A |
| 4,254,921 | 3/1981 | Adomeit ................ | 242/107.4 C |
| 4,429,840 | 2/1984 | Chawla et al. ................ | 242/107 |
| 4,432,507 | 2/1984 | Rietsch et al. ................ | 242/107 X |
| 4,509,707 | 4/1985 | Ernst et al. ................ | 242/107.4 B X |

*Primary Examiner*—John M. Jillions
*Attorney, Agent, or Firm*—Parkhurst & Oliff

[57] ABSTRACT

A retractor is employed in a seatbelt system designed to protect an occupant of a vehicle when an emergency situation occurs, and is adapted to wind up an occupant fastening webbing. A winding drum of a resin for winding up the webbing is disposed on the outer periphery of a metallic core member. Thus, it is possible to increase the outer diameter of the winding drum without a substantial increase in the weight. A compressive force generated by a webbing pulling force is transmitted to the core member, so that it is possible for the winding drum to endure a relatively large pulling force. A ratchet wheel and the winding drum are reliably connected together by means of a retaining portion of a synthetic resin which is disposed outside the ratchet wheel and is integrally connected to the winding drum through a bore which is formed in the ratchet wheel.

27 Claims, 8 Drawing Figures

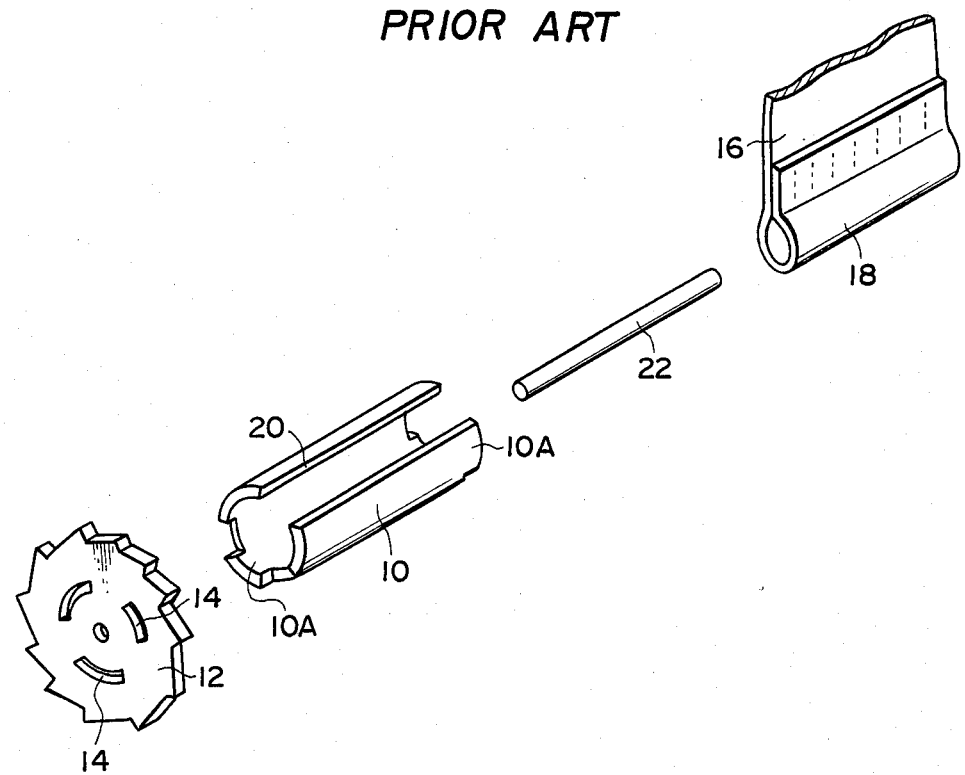

RETRACTOR

BACKGROUND OF THE INVENTION

1. Field of the Invention

The present invention relates to a webbing retractor for use in a seatbelt system designed to protect an occupant of a vehicle when an emergency situation occurs, the apparatus being employed to wind up an occupant restraining webbing from one end of the same which is retained thereby.

2. Description of the Prior Art

A conventional webbing retractor which is employed in a seatbelt system and is adapted to wind up an occupant restraining webbing from one end thereof includes a webbing takeup shaft which is disposed therein and retains one end of an occupant restraining webbing.

FIG. 8 is an exploded perspective view of a webbing takeup shaft generally employed. The takeup shaft includes a winding drum 10 which is formed by bending a metal plate material into a cylindrical shape. The winding drum 10 has engagement projections 10A formed at both axial ends thereof. The engagement projections 10A are respectively received through engagement bores 14 which are formed in ratchet wheels 12, and the respective distal end portions of the projections 10A are caulked, whereby the winding drum 10 and the ratchet wheels 12 are assembled into an integral structure. A looped portion 18 which is formed at one end of an occupant restraining webbing 16 is inserted into the inside of the winding drum 10 through a notch 20 formed in a portion of the winding drum 10. A pin 22 which is inserted into the central axis portion of the winding drum 10 is fitted into the looped portion 18 in such a manner as to expand the diameter of the looped portion 18, whereby the looped portion 18 is prevented from being pulled out from the winding drum 10. Thus, one end of the webbing 16 is retained by the winding drum 10.

Such a conventional takeup shaft structure, however, suffers from the following disadvantages. Namely, if the winding drum 10 is formed from a thin metal plate, it may be deformed and lead to an increase in the length of the webbing 16 which is undesirably wound off at the time of occurrence of a vehicular emergency situation. Further, when the diameter of the winding drum 10 is increased for the purpose of increasing the winding force thereof or of reducing variations in the winding torque, the weight of the takeup shaft as a whole is undesirably increased since the winding drum 10 is made of a metal.

SUMMARY OF THE INVENTION

In view of the above-described facts, it is a primary object of the present invention to provide a webbing retractor having a winding drum which is improved in terms of the reduced degree of deformation which may be caused when a vehicular emergency situation occurs, the winding drum further being favorably light in weight while still having a relatively large diameter.

To this end, the invention provides a webbing retractor in which a metallic core member is stretched between a pair of ratchet wheels and is adapted to retain a looped portion of an occupant restraining webbing, and a winding drum made of a synthetic resin and covering the outer periphery of the core member is integrally connected at both ends thereof through connecting portions to retaining portions which are respectively disposed outside the ratchet wheels, the connecting portions being inserted into a plurality of throughholes which are formed in each of the ratchet wheels around its axis.

By virtue of the above-described arrangement, since the winding drum is filled with a synthetic resin, it is advantageously difficult for the winding drum to be deformed even if a heavy load acts thereon when a vehicular emergency situation occurs, and the winding drum favorably involves no increase in the weight of the takeup shaft.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 8 is an exploded perspective view of a takeup shaft employed in a conventional webbing retractor apparatus.

DESCRIPTION OF THE PREFERRED EMBODIMENTS

Figure 1:
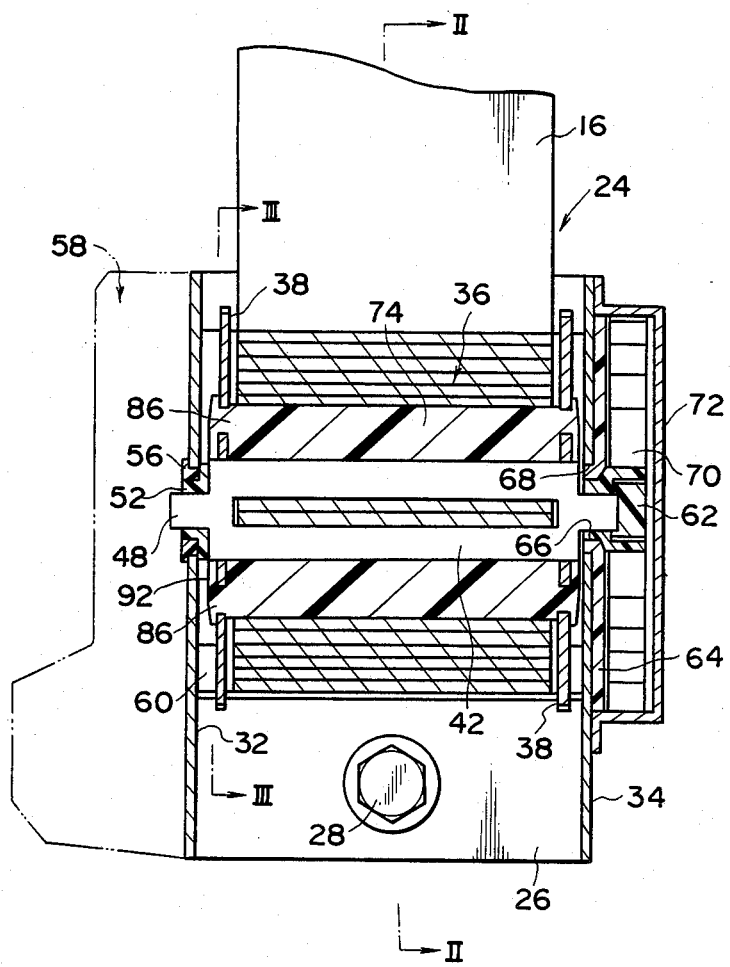
FIG. 1 is a sectional view of a first embodiment of the webbing retractor according to the present invention.
Figure 2:
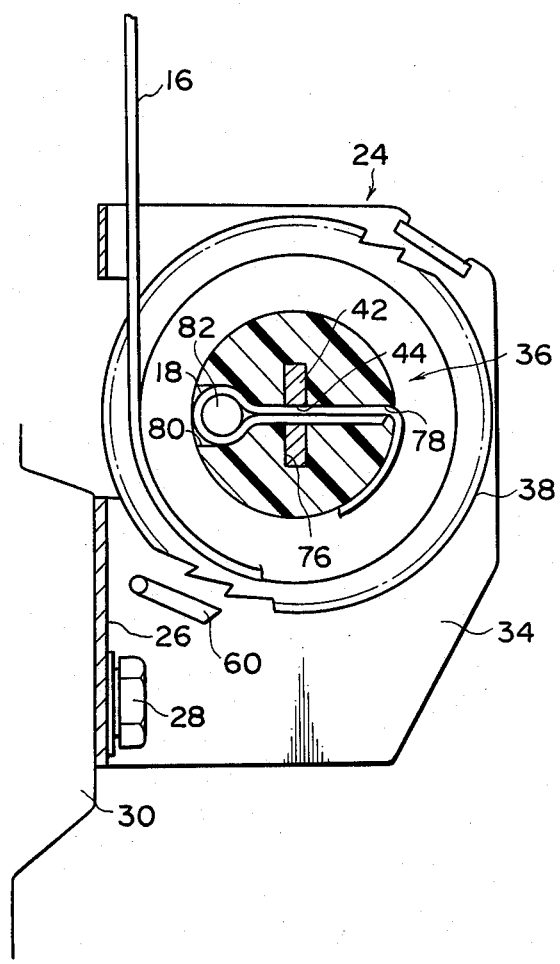
FIG. 2 is a sectional view taken along the line II—II of FIG. 1.
Figure 3:
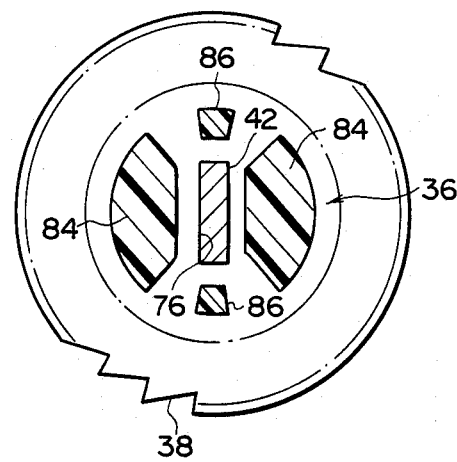
FIG. 3 is a sectional view taken along the line III—III of FIG. 1, which shows a webbing takeup shaft employed in the webbing retractor according to the invention.

Referring first to FIGS. 1 and 2, there is shown a webbing retractor 24 in accordance with a first embodiment of the present invention. The retractor 24 has a frame 26 secured to a vehicle body 30 by employing a bolt 28.

The frame 26 is provided with leg plates 32 and 34 which are formed by bending two side portions of the frame 26 at right angles, the leg plates 32 and 34 thus extending in parallel to each other. A webbing takeup shaft 36 is stretched between these leg plates 32 and 34.

Figure 4:
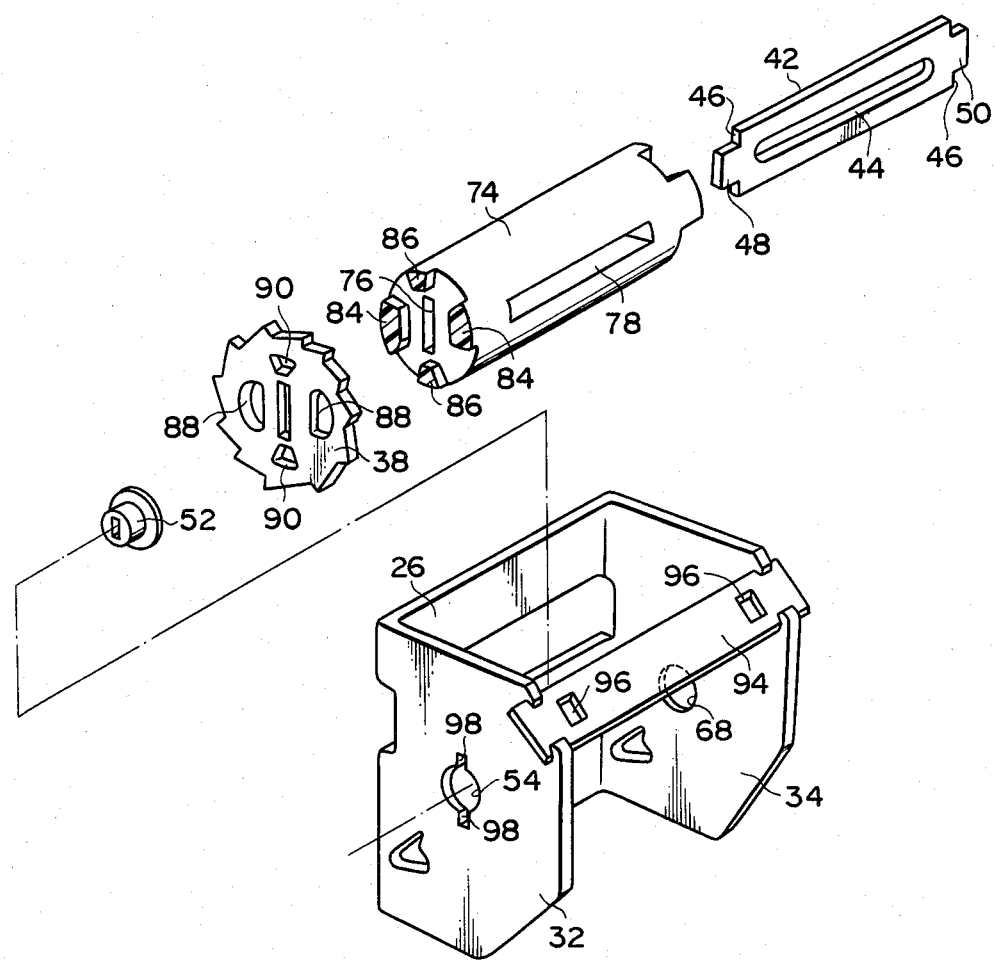
FIG. 4 is an exploded perspective view of an essential portion of the first embodiment of the webbing retractor according to the invention.

As shown in FIGS. 2 and 4, the takeup shaft 36 has a plate-like core member 42 disposed in the central axis portion thereof. The core member 42 is formed in its central portion with a slot 44 which allows a looped portion 18 of an occupant restraining webbing 16 to pass therethrough.

The core member 42 is formed at both axial end portions thereof with abutting portions 46 and smaller-width portions 48 and 50 which respectively extend through ratchet wheels 38 and project therefrom. A bush 52 is fitted onto the smaller-width portion 48, as shown in FIGS. 1 and 4. The bush 52 is rotatably supported by a sleeve 56 provided inside a circular bore 54 which is formed in the leg plate 32. The sleeve 56 is adapted to allow an internal gear (not shown) of an acceleration sensor means 58 to be secured to the sleeve 56, the acceleration sensor means 58 being provided outside the leg plate 32. The acceleration sensor means 58 is arranged such that, when a vehicular emergency situation occurs, a pawl 60 which is pivotally supported by the leg plates 32 and 34 is caused by the sensor means 58 to engage with the ratchet wheels 38, thereby suspending the rotation of the ratchet wheels 38.

On the other hand, the smaller-width portion 50 has a spring retaining bush 62 secured thereto. The spring retaining bush 62 is rotatably supported by a collar portion 66 of a spring seat 64 which is mounted on the outside of the leg plate 34. This collar portion 66 is inserted into a circular bore 68 which is formed in the leg plate 34. The spring retaining bush 62 retains the inner end of a spiral spring 70, the outer end of which is retained by the leg plate 34 through a spring casing 72.

Thus, the plate-like core member 42 and the ratchet wheels 38 are adapted to generate a biasing force which is employed to wind up the webbing 16.

A winding drum 74 of a glass-fiber reinforced resin is disposed on the outer periphery of the plate-like core member 42. This winding drum 74 is integrally molded from a synthetic resin. The winding drum 74 has a bore 76 axially extending therethrough, the bore 76 having a rectangular cross-section which enables the core member 42 to be received therethrough. The winding drum 74 also has a webbing inserting bore 78 extending radially thereof in such a manner that the bore 78 coincides with the slot 44 formed in the core member 42, as shown in FIG. 2. One end of the webbing inserting bore 78 is, as shown in FIG. 2, increased in width to provide an expanded-width portion 80 which enables a retainer pin 82 to be received therein.

More specifically, the looped portion 18 of the webbing 16 is passed through the webbing inserting bore 78 and the slot 44 and is then once pulled out toward the expanded-width portion 80, and after the retainer pin 82 has been inserted into the looped portion 18, the looped portion 18 is drawn into the webbing inserting bore 78. Thereupon, since the outer diameter of the looped portion 18 has already been expanded by means of the retainer pin 82, the looped portion 18 is retained by the edge of the webbing inserting bore 78 and therefore prevented from being undesirably pulled out from the winding drum 74. The other end (not shown) of the webbing 16 constitutes an occupant fastening portion.

A pair of connecting portions 84 and a pair of connecting portions 86 project from each of the axial end faces of the winding drum 74 in the axial direction thereof, these projections being spaced along the circumference of the corresponding end face. More specifically, the connecting portions 84 and 86 are disposed at substantially equal distances about the axis of the rectangular bore 76. The outer periphery of each of the connecting portions 84 and 86 forms a surface which is flush with that of the outer periphery of the winding drum 74.

The connecting portions 84 and 86 are respectively received through through-holes 88 and 90 which are formed in each of the ratchet wheels 38 at substantially equal distances about the axis of the rectangular bore 76 in a manner similar to that of the connecting portions 84 and 86. The respective ends of the connecting portions 84 and 86 which project from each ratchet wheel 38 are integrally connected to a retaining portion 92. Each of the retaining portions 92 has a disk-like shape, and the outer diameter of the retaining portion 92 is set such as to be slightly larger than that of the winding drum 74. The retaining portions 92 serve to prevent the pair of ratchet wheels 38 from being deformed in such a manner as to separate from each other axially of the winding drum 74.

It is preferable for the winding drum 74, the connecting portions 84, 86 and the retaining portions 92 to be formed together with the pair of ratchet wheels 38 by means of insert molding.

It is to be noted that a reinforcing plate 94 is stretched between the leg plates 32 and 34. The reinforcing plate 94 has retainer bores 96 formed at both end portions thereof for the purpose of partially receiving the respective outer peripheries of the ratchet wheels 38 as the takeup shaft 36 is deformed when a vehicular emergency situation occurs, thereby ensuring the locking of the webbing 16.

The procedure of assembling the above-described embodiment will now be described.

The ratchet wheels 38 and the winding drum 74 are integrally molded in advance. Thus, the connecting portions 84, 86 and the retaining portion 92 are integrally formed with each of the axial end portions of the winding drum 74 and are thereby firmly connected to each of the ratchet wheels 38.

This assembly is disposed between the leg plates 32 and 34, and the bush 52 is inserted into the circular bore 54. In addition, the plate-like core member 42 is received between the leg plates 32 and 34 and is inserted into the winding drum 74. In this case, each of the circular bores 54 and 68, which are respectively formed in the leg plates 32 and 34, has two notches 98 formed on the circumference thereof in such a manner as to oppose each other, the notches 98 enabling the plate-like core member 42 to pass therethrough. Thus, it is possible to reduce the respective diameters of the bush 52 and the spring retaining bush 62 and consequently to decrease the frictional resistance acting on the takeup shaft 36.

After the plate-like core member 42 has been inserted into the winding drum 74, the looped portion 18 of the webbing 16 is received through the webbing inserting bore 78 and the slot 44, and the retainer pin 82 is inserted into the looped portion 18 which is now located on the side of the core member 42 which is remote from the webbing inserting bore 78. Then, a pulling force is applied to the webbing 16. Thereupon, the webbing 16 is reliably retained by the takeup shaft 36, as shown in FIG. 2. Thereafter, the sleeve 56, the spring retaining bush 62, the spring seat 64 and so forth are properly mounted, and the spiral spring 70, together with the spring casing 72, is mounted on the leg plate 34, thus completing the assembling of the takeup shaft 36.

It is to be noted that the webbing 16 may be retained by the takeup shaft 36 after the spiral spring 70 has been mounted on the leg plate 34 and retained by the takeup shaft 36.

In consequence, the webbing 16 is subjected to the wind-up force of the spiral spring 70. It is therefore possible for an occupant of the vehicle to be placed in an appropriate webbing fastened condition at all times by properly winding off the webbing 16 from the webbing retractor 24. When a vehicular emergency situation occurs, the occupant is brought into a webbing restrained condition by the operation of the acceleration sensing means 58. Even if a relatively large tension acts on the webbing 16 when a vehicular emergency situation occurs, there is no risk of the winding drum 74 being crushed since it is solid, unlike winding drums in the prior art, which are hollow. Moreover, the length of the webbing 16 which is undesirably wound off when it is locked is advantageously reduced. Since the retaining portions 92 retain the respective ratchet wheels 38 from the outside thereof, there is also no risk of the ratchet wheels 38 falling off. Further, if the winding drum 74 should be broken by the application of a specially heavy load, the plate-like core member 42 reliably supports the required webbing tension.

The takeup shaft 36 in accordance with this embodiment, formed as described above, includes the winding drum 74 made of a synthetic resin. For this reason, it is possible by increasing the outer diameter of the winding drum 74 to constantly apply a substantially uniform wind-up force to the webbing 16, irrespective of the number of turns of the webbing 16 wound on the outer periphery of the winding drum 74 and without any increase in the weight of the takeup shaft 36.

Further, since the connecting portions 84 and 86 are connected to each of the retaining portions 92 at positions which are relatively remote from the axis of the takeup shaft 36, the connecting portions 84 and 86 have a favorably large resistance against torsional torque. Furthermore, since the ratchet wheels 38 are respectively connected to both end portions of the winding drum 74, it is possible to provide the takeup shaft 36 with an advantageously large strength even when the ratchet wheels 38 are engaged with the pawl 60 at the time of a vehicular emergency. The strength of the takeup shaft 36 is also increased by the fact that the connecting portions 84 and 86 are disposed about the axis of the winding drum 74 at substantially equal distances.

Figure 5:
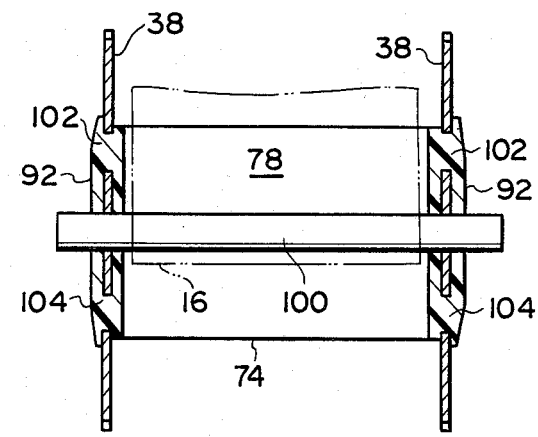
FIG. 5 is a sectional view of an essential portion of a second embodiment of the webbing retractor according to the invention.
Figure 6:
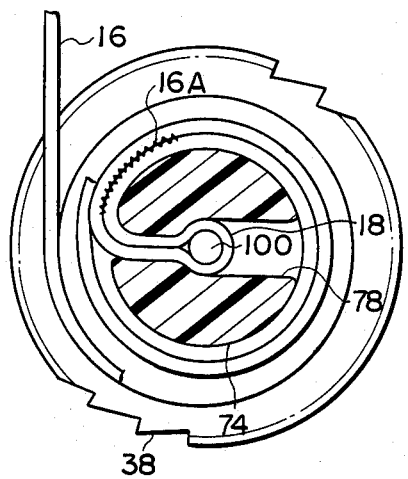
FIG. 6. is a sectional view corresponding to FIG. 2, which shows a webbing takeup shaft employed in the second embodiment.
Figure 7:
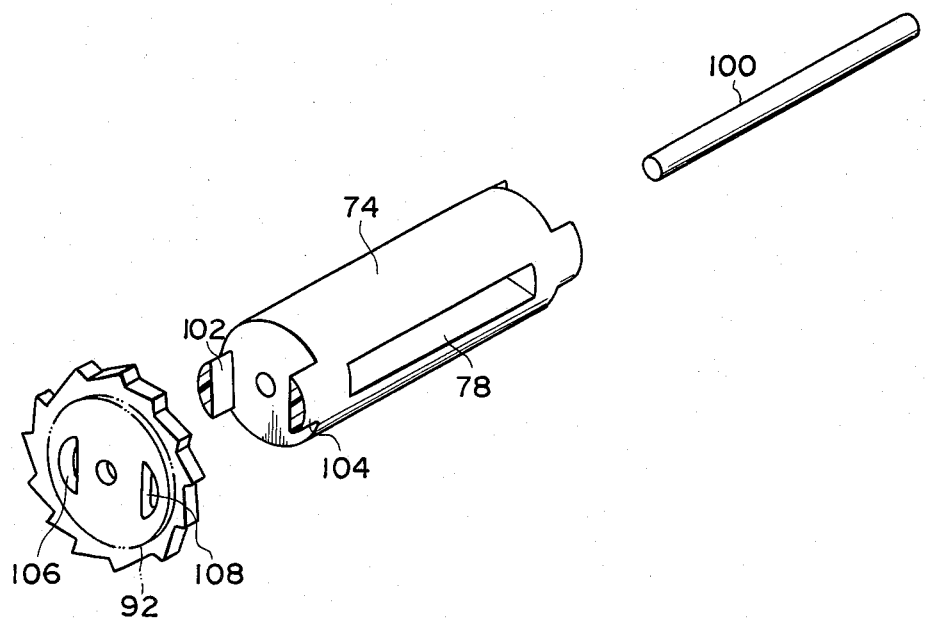
FIG. 7 is an exploded perspective view of an essential portion of the second embodiment.

Referring next to FIGS. 5 to 7, there is shown an essential portion of a second embodiment of the present invention.

In this embodiment, the core member which extends through the respective axes of the ratchet wheels 38 and the winding drum 74 is constituted by a pin 100. In addition, connecting portions 102 and 104 are formed at each of the axial end portions of the winding drum 74 in such a manner as to oppose each other. The connecting portions 102 and 104 are disposed at positions relatively remote from the axis of the winding drum 74 and are connected to each of the retaining portions 92 through respective through-holes 106 and 108 formed in each of the ratchet wheels 38 in a manner similar to that in the first-described embodiment. Thus, the connecting portions 102 and 104 have an advantageously large resistance against torsional torque.

In this embodiment, it is possible for the looped portion 18 of the webbing 16 to be retained by the winding drum 74 through the pin 100 after the winding drum 74 and the ratchet wheels 38 have been integrally molded, in a manner similar to the first-described embodiment. However, the webbing 16 may be retained by the winding drum 74 in the following manner. Namely, the pin 100 is integrally formed with the winding drum 74 beforehand in a state such as that shown in FIG. 5, and the end portion of the webbing 16 is passed over the pin 100. The folded portions of the webbing 16 are then sewn to each other to provide a sewn portion 16A, thus forming the looped portion 18.

What is claimed is:

1. A retractor for use in a seatbelt system designed to protect an occupant of a vehicle when an emergency situation occurs, which comprises:
   (a) a frame secured to a vehicle body;
   (b) a metallic core member rotatably supported by said frame and having one end of a webbing directly or indirectly secured thereto;
   (c) a webbing takeup winding drum provided on the outer periphery of said core member, said winding drum being made of a synthetic resin which endures a compressive force applied thereto by said webbing;
   (d) a ratchet wheel disposed at one axial end of said winding drum and on the outer periphery of said core member, said ratchet wheel constituting a part of lock means which is actuated when a vehicular emergency situation occurs; and
   (e) a plate-like retaining portion of a synthetic resin disposed outside said ratchet wheel, said retaining portion being received through said ratchet wheel and intergrally connected to said winding drum through connecting portions, said connecting portions being disposed at substantially equal distances about the axis of said winding drum, whereby the connection between said ratchet wheel and said winding drum is ensured.

2. A retractor according to claim 1, wherein the outer periphery of each of said connecting portions forms a surface which is flush with that of the outer periphery of said winding drum.

3. A retractor according to claim 1, wherein the outer diameter of said retaining portion is larger than the outer diameter of said winding drum.

4. A retractor according to claim 1, wherein said core member is made from a metallic plate material.

5. A retractor according to claim 4, wherein said core member and said winding drum are respectively formed with bores for passing said webbing, said bores having the same inner diameter.

6. A retractor according to claim 5, wherein said bore formed in said core member has a dimension slightly greater than twice the thickness of said webbing.

7. A retractor according to claim 4, wherein one longitudinal end portion of said core member projects from said winding drum and is rotatably supported by said frame through a bush.

8. A retractor according to claim 4, wherein a bore which is formed in said frame for rotatably supporting said bush has two notches formed on its circumference in such a manner as to oppose each other, said notches being used to insert said core member when it is mounted, and said bush supporting bore and said bush having relatively small diameters.

9. A retractor according to claim 1, wherein said frame has a pair of leg plates between which a reinforcing plate is stretched, said reinforcing plate having a retainer bore which partially receives the outer periphery of said ratchet wheel when said winding drum is deformed at the time of a vehicular emergency, thereby ensuring the locking of said webbing.

10. A retractor according to claim 1, wherein said core member is formed from a metallic rod material.

11. A webbing retractor which is employed in a seatbelt system for a vehicle and is of the type in which lock means suspends the rotation of a takeup shaft for unwinding a webbing when a vehicular emergency situation occurs, said retractor comprising:

(a) a pair of ratchet wheels constituting a part of said lock means;

(b) a metallic core member stretched between said ratchet wheels;

(c) a winding drum of a synthetic resin covering the outer periphery of said core member;

(d) retaining portions of a synthetic resin respectively disposed outside said ratchet wheels; and (e) connecting portions respectively inserted into a plurality of through-holes formed in each of said ratchet wheels about its axis, said connecting portions integrally connecting together said winding drum and said retaining portions, whereby a torsional force applied to said winding drum is reliably transmitted to said ratchet wheels.

12. A webbing retractor according to claim 11, wherein said connecting portions are disposed at substantially equal distances about the axis of said winding drum.

13. A webbing retractor according to claim 11, wherein the outer periphery of each of said connecting portions forms a surface which is flush with that of the outer periphery of said winding drum.

14. A retractor according to claim 11, wherein the outer diameter of said retaining portions is larger than the outer diameter of said winding drum.

15. A retractor according to claim 11, wherein said core member is made from a metallic plate material.

16. A retractor according to claim 15, wherein said core member and said winding drum are respectively formed with bores for passing said webbing, said bores having the same inner diameter.

17. A retractor according to claim 15, wherein one longitudinal end portion of said core member projects from said winding drum and is rotatably supported by said frame through a bush.

18. A retractor for winding up a webbing which is fastened to an occupant of a vehicle, said retractor comprising: a frame secured to the body of said vehicle; a core member constituted by a metal plate and rotatably supported by said frame; a winding drum disposed on the outer periphery of said core member in such a manner that the inner periphery of said winding drum contacts said core member, said winding drum having said webbing wound on its outer periphery, and said winding drum being adapted to transmit a compressive force applied thereto by said webbing to said core member and to endure a relatively large webbing wind-off force; metallic ratchet wheels which are respectively disposed on both sides of said winding drum and are prevented from rotating when a vehicular emergency situation occurs; and retaining plates of a synthetic resin respectively disposed outside said ratchet wheels and integrally connected to said winding drum through connecting portions extending through respective through-holes formed in said ratchet wheels, whereby said ratchet wheels and said winding drum are firmly connected.

19. A retractor according to claim 18, wherein said connecting portions are disposed at substantially equal distances about the axis of said winding drum.

20. A retractor according to claim 18, wherein the outer periphery of each of said connecting portions forms a surface which is flush with that of the outer periphery of said winding drum.

21. A retractor according to claim 18, wherein the outer diameter of said retaining plates is larger than the outer diameter of said winding drum.

22. A retractor according to claim 18, wherein said core member and said winding drum are respectively formed with bores for passing said webbing, said bores having the same inner diameter.

23. A retractor according to claim 18, wherein one longitudinal end portion of said core member projects from said winding drum and is rotatably supported by said frame through a bush.

24. A retractor according to claim 18, wherein a bore which is formed in said frame for rotatably supporting said bush has two notches formed on its circumference in such a manner as to oppose each other, said notches being used to insert said core member when it is mounted, and said bush supporting bore and said bush having relatively small diameters.

25. A retractor for use in a seatbelt system designed to protect an occupant of a vehicle when an emergency situation occurs, which comprises:

(a) a frame secured to a vehicle body;

(b) a metallic core member rotatably supported by said frame and having one end of a webbing directly or indirectly secured thereto;

(c) a webbing takeup winding drum provided on the outer periphery of said core member, said winding drum being made of a synthetic resin which endures a compressive force applied thereto by said webbing;

(d) a ratchet wheel disposed at one axial end of said winding drum and on the outer periphery of said core member, said ratchet wheel constituting a part of lock means which is actuated when a vehicular emergency situation occurs; and (e) a plate-like retaining portion of a synthetic resin disposed outside said ratchet wheel, said retaining portion being received through said ratchet wheel and intergrally connected to said winding drum through connecting portions, the outer periphery of each of said connecting portions forming a surface which is flush with that of the outer periphery of said winding drum, whereby the connection between said ratchet wheel and said winding drum is ensured.

26. A retractor for use in a seatbelt system designed to protect an occupant of a vehicle when an emergency situation occurs, which comprises:

(a) a frame secured to a vehicle body;

(b) a metallic core member made from a metallic plate material, said metallic core member being rotatably supported by said frame through a bush and having one end of a webbing directly or indirectly secured thereto;

(c) a bore formed in said frame for rotatably supporting said bush, said bore having two notches formed on its circumference in such a manner as to oppose each other, said notches being used to insert said core member when it is mounted, and said bush supporting bore and said bush having relatively small diameters;

(d) a webbing takeup winding drum provided on the outer periphery of said core member, said winding drum being made of a synthetic resin which endures a compressive force applied thereto by said webbing;

(e) a ratchet wheel disposed at one axial end of said winding drum and on the outer periphery of said core member, said ratchet wheel constituting a part of lock means which is actuated when a vehicular emergency situation occurs; and (f) a plate-like retaining portion of a synthetic resin disposed outside said ratchet wheel, said retaining portion being received through said ratchet wheel and intergrally connected to said winding drum through connecting portions, whereby the connection between said ratchet wheel and said winding drum is ensured.

27. A retractor for use in a seatbelt system designed to protect an occupant of a vehicle when an emergency situtation cocurs, which comprises:

(a) a frame secured to a vehicle body;
(b) a metallic core member rotatably supported by said frame and having one end of a webbing directly or indirectly secured thereto;
(c) a webbing takeup winding drum provided on the outer periphery of said core member, said winding drum being made of a synthetic resin which endures a compressive force applied thereto by said webbing;
(d) a ratchet wheel disposed at one axial end of said winding drum and on the outer periphery of said core member, said ratchet wheel constituting a part of lock means which is actuated when a vehicular emergency situation occurs, said frame having a pair of leg plates between which a reinforcing plate is stretched, said reinforcing plate having a retainer bore which partially receives the outer periphery of said ratchet wheel when said winding drum is deformed at the time of a vehicular emergency, thereby ensuring the locking of said webbing; and
(e) a plate-like retaining portion of a synthetic resin disposed outside said ratchet wheel, said retaining portion being received through said ratchet wheel and intergrally connected to said winding drum through connecting portions, whereby the connection between said ratchet wheel and said winding drum is ensured.

* * * * *